(12) United States Patent
Muramatsu

(10) Patent No.: US 6,869,187 B2
(45) Date of Patent: Mar. 22, 2005

(54) PROJECTION TYPE DISPLAY APPARATUS

(75) Inventor: Masahiro Muramatsu, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/609,689

(22) Filed: Jul. 1, 2003

(65) Prior Publication Data

US 2004/0046943 A1 Mar. 11, 2004

(30) Foreign Application Priority Data

Jul. 1, 2002 (JP) ........................................ 2002-192682

(51) Int. Cl.[7] ........................ G03B 21/22; G03B 21/00; G03B 21/14; G03B 21/56
(52) U.S. Cl. ............................. 353/76; 353/74; 353/69; 353/100; 359/460
(58) Field of Search ............................. 353/74–79, 70, 353/31, 85, 69, 100; 359/460, 694–706; 348/747, 751, 758, 785

(56) References Cited

U.S. PATENT DOCUMENTS

| | | | |
|---|---|---|---|
| 5,048,949 A | | 9/1991 | Sato et al. |
| 5,658,062 A | * | 8/1997 | Lee et al. ........................ 353/85 |
| 5,829,855 A | * | 11/1998 | Uchiyama ..................... 353/74 |
| 5,860,721 A | * | 1/1999 | Bowron et al. .............. 353/101 |
| 5,978,051 A | * | 11/1999 | Gohman et al. ............ 348/766 |
| 6,183,094 B1 | * | 2/2001 | Ohta ............................. 353/38 |
| 6,592,228 B1 | * | 7/2003 | Kawashima et al. ........ 353/101 |

FOREIGN PATENT DOCUMENTS

| | | |
|---|---|---|
| JP | 2-209092 | 8/1990 |
| JP | 04-175742 | 6/1992 |
| JP | 5-088252 | 4/1993 |
| JP | 6-245176 | 9/1994 |
| JP | 6-337651 | 12/1994 |
| JP | 7-059036 | 3/1995 |
| JP | 7-26842 | 5/1995 |
| JP | 2569632 | 10/1996 |
| JP | 9-312729 | 12/1997 |
| JP | 9-312803 | 12/1997 |
| JP | 2000-122594 | 4/2000 |

* cited by examiner

*Primary Examiner*—Judy Nguyen
*Assistant Examiner*—Andrew Sever
(74) *Attorney, Agent, or Firm*—Pillsbury Winthrop LLP

(57) ABSTRACT

Light radiated from a light source passes through a liquid crystal display device and a projection lens and is reflected by a mirror, thus reaching a screen. The projection lens has a zoom function to scale up an image displayed on the display device by an arbitrary scaling factor. A microcomputer determines, based on an image signal, the scaling factor of the image to be displayed on the screen and controls a projection lens drive motor so that the image displayed on the display device may be projected onto the screen, scaled up by this scaling factor.

5 Claims, 7 Drawing Sheets

PROJECTION TYPE DISPLAY APPARATUS

CROSS-REFERENCE TO RELATED APPLICATIONS

This application is based upon and claims the benefit of priority from the prior Japanese Patent Application No. 2002-192682, filed Jul. 1, 2002, the entire contents of which are incorporated herein by reference.

BACKGROUND OF THE INVENTION

1. Field of the Invention

The invention relates to a projection type display apparatus, and more particularly to a projection type display apparatus which uses a display device having a fixed number of display pixels, such as a liquid crystal panel as a light valve.

2. Description of the Related Art

As a projection type display apparatus which uses a display device such as a liquid crystal panel, there is known, for example, a rear projection type display apparatus (hereinafter called a rear projector). The rear projector is adapted to display an image which is projected onto the rear surface of a screen from the projector so that a viewer can view the image from the front of the screen.

The rear projector using the liquid crystal panel will be described as follows: A configuration of the rear projector has the liquid crystal panel which is irradiated with light emitted from a light source; a driver circuit which drives this liquid crystal panel by an image signal; and a projection lens for projecting the light emitted from the liquid crystal panel onto a screen, whereby the image light from the projection lens is projected on to the rear side of the screen. It is to be noted that the image light from the projection lens is reflected by a mirror to be projected onto the screen. Furthermore, an incoming image signal for driving the liquid crystal panel is supplied from a signal processing circuit, which is controlled by a control circuit, such as a microcomputer.

Where the liquid crystal panel is of a transmission type, the light projected from the light source is made incident upon one face of the liquid crystal panel and goes through it, so that the resultant outgoing light is subject to intensity modulation by means of the image signal and made incident upon the projection lens. The light from the projection lens is diverged and reflected by the mirror and projected onto the rear face of the screen. As a result, an image displayed on a display face of the liquid crystal panel is projected as scaled up onto the screen visually. In such a manner, a viewer can view the scaled up image on the screen.

One of such rear projectors is disclosed in, for example, Japanese Patent Publication No. 2569632.

In the case where the liquid crystal panel has 1920×1080 display pixels to represent an image signal (1080*p*) which accommodates an image having the same number of pixels, the image is displayed using an overall display surface of the screen. If, however, an image (720*p*) having a smaller number, for example 1280×720, of pixels than those given above is to be displayed, the image is displayed in an area having as many as its number of pixels and, therefore, it is rendered smaller on the screen. That is, the smaller the number of pixels, the smaller the relevant image displayed on the screen.

Thus, in the case of the conventional projection type display apparatus, if the number of pixels contained in the incoming image signal is smaller than the number of all of the display pixels of a display device (for example, liquid crystal panel), the image is displayed correspondingly smaller on the screen and so may be degraded in impact etc., so that a viewer may feel uncomfortable.

Therefore, to cope with such a situation, such an approach is employed that if an image having a small number of pixels is input, signal processing is performed to convert the number of pixels contained in the relevant image signal so that this number may agree with the number of all the display pixels of the display device, for example, the liquid crystal panel, in order to display the converted image on the liquid crystal panel, thus displaying it as scaled up on the screen.

Such an approach for increasing or decreasing the number of pixels contained in the image signal by signal processing is herein called scaling. By this scaling processing, which is performed utilizing a microcomputer, the number, type, etc., of pixels are detected on the basis of the input image signal, to perform scaling in such a manner as to match the number of pixels of a display device employed. As a result, an image display method for the liquid crystal panel is switched, thus eliminating the disadvantage that the display viewing surface is reduced in size on the screen.

Display by scaling, however, may fundamentally lead to impairment of the feeling of focus because some pixels which are not actually present are produced by operational processing, such as interpolation. To increase the size of the display viewing surface in an integer multiple, for example, such processing can be performed as to scale up in that multiple the signal containing all of the pixels of a relevant image. Actually, however, a scaling factor of 1.5, etc., is required. To scale up the image by a factor of 1.5, etc., requires complicated interpolation and the image signal obtained as a result of interpolation is distorted more or less, thus making it impossible to provide optimal screen display.

Thus, the expansion of the display viewing surface by scaling has the disadvantage that a signal processing circuit becomes complicated thereby increasing the cost and requiring prolonged time for development.

BRIEF SUMMARY OF THE INVENTION

According to an aspect of the invention, there is provided a projection type display apparatus which drives a display device by an input image signal to thereby project an image displayed on the display device onto a screen for display. The display device has a predetermined number of display pixels. A light source serves to make light incident upon the display device. A projection lens serves to project the image light emitted from the display device onto the screen and also has a zoom function to scale up the projected image by an arbitrary scaling factor. A projection lens drive section operates the projection lens to alter the projection scaling factor. A control section sets the scaling factor in accordance with a type of the input image signal to thereby control the projection lens drive section in accordance with the scaling factor thus set. The control section sets the scaling factor so that a size of a viewing surface displayed on the screen may be essentially the same in a case where the image displayed in a first region of the display device is projected onto the screen and in a case where the image displayed in a second region which is smaller than the first region is projected onto the screen.

DETAILED DESCRIPTION OF THE INVENTION

The following will describe in detail embodiment of the invention with reference to drawings. Although the embodiments are described below in an example of a rear projection type display apparatus (rear projector), a device according to the invention is applicable also to a front projection type display apparatus.

Figure 1:
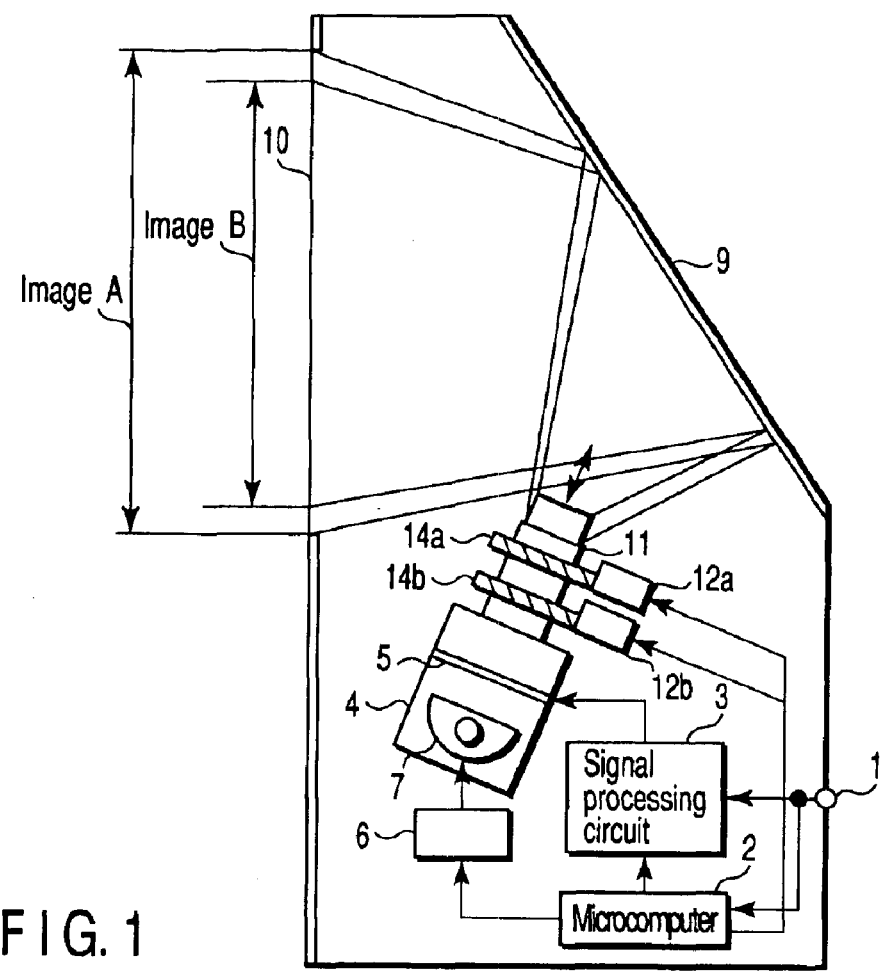
FIG. 1 is a block diagram of a configuration of a rear projector according to one embodiment of the invention.

Referring to FIG. 1, a transmission type liquid crystal panel 5 is employed as the display device to enable display of an image having a variety of aspect ratios.

An image signal which is input to an image input terminal 1 is supplied to a signal processing circuit 3 and a microcomputer 2. The microcomputer 2 detects the number of horizontal and vertical pixels, and aspect ratio, etc. from the input image signal, to issue a command to the signal processing circuit 3, thus providing control such as switching of a method of displaying an image on the liquid crystal panel 5.

The liquid crystal panel 5 is arranged in an optical engine 4 and driven by the image signal sent from the signal processing circuit 3, so that the image based on the image signal is displayed in a display area of the liquid crystal panel 5. Further, the optical engine 4 has a light source 7 therein, which is controlled in terms of light emission condition by a lighting circuit 6. The lighting circuit 6 operates under the control of the microcomputer 2, to control lighting/extinction of the light source 7 etc.

Light from the light source 7 passes through the display area of the liquid crystal panel 5 and is made incident upon a projection lens 11. This incident light is diverged and then reflected by a mirror 9, to reach a screen 10.

The projection lens 11 has a zoom function. A zoom ring 14a is turned by a motor 12a. The motor 12a rotates under the control of the microcomputer 2 to thereby turn the zoom ring 14a, which in turn moves the projection lens 11 along an optical axis, thus altering a scaling factor of the image to be displayed on the screen 10.

A focus ring 14b is turned by a motor 12b. The motor 14b rotates under the control of the microcomputer 2 to thereby turn the focus ring 12b, thus controlling focusing of the image to be displayed on the screen 10. Thus, the image displayed in the display area of the liquid crystal panel 5 is scaled up and projected onto the screen 10 so as to be displayed clearly.

Figure 2A:
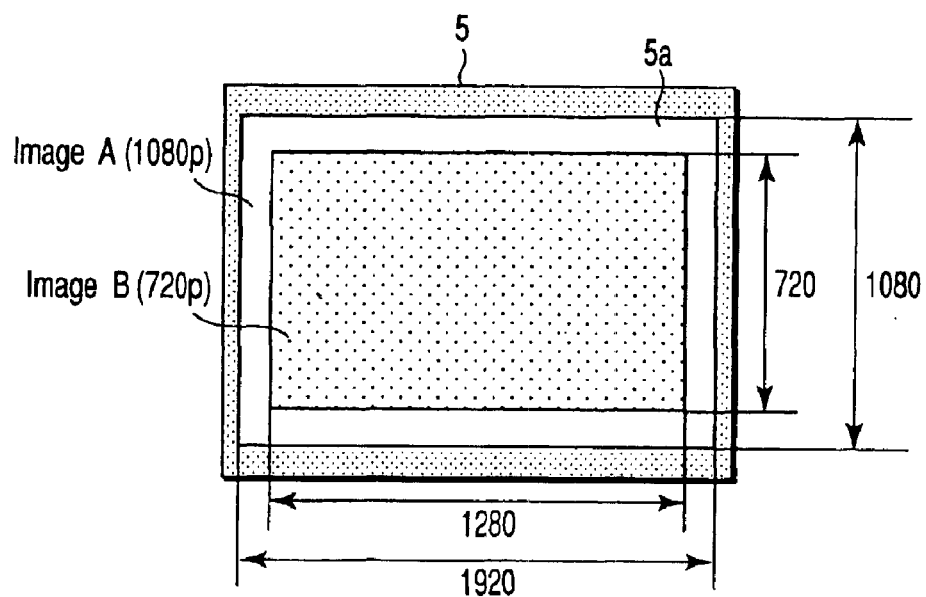
FIGS. 2A and 2B show a liquid crystal panel and viewing surfaces to be displayed on a screen.
Figure 2B:
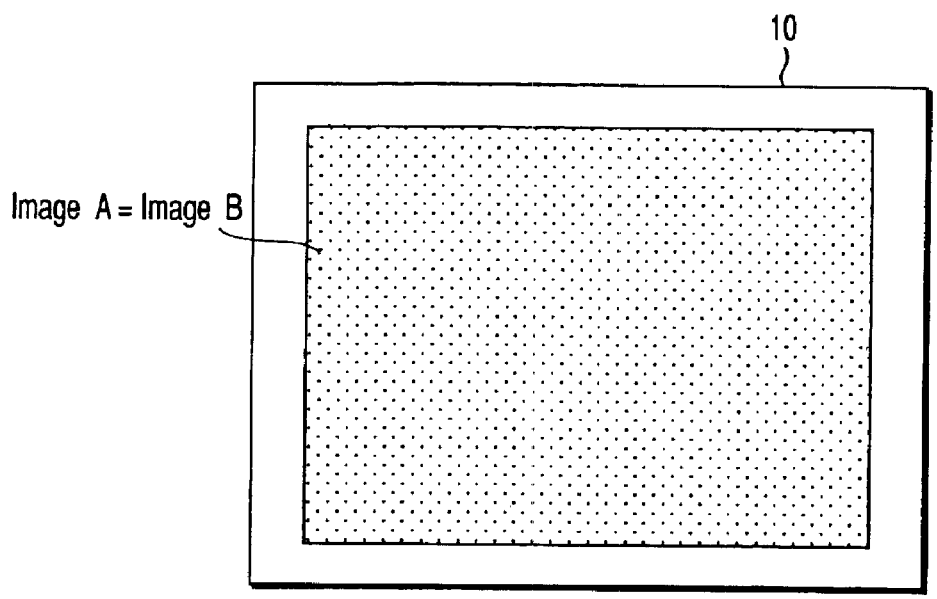

FIG. 2A indicates the viewing surface to be displayed on the liquid crystal panel 5 and FIG. 2B, the viewing surface to be displayed on the screen 10. In the present embodiment, it is supposed that the display area 5a of the liquid crystal panel 5 is provided with 1920×1080 display pixels. It is to be noted that the number of the display pixels provided is not limited and the invention is applicable to a projector having a liquid crystal panel provided with varying number of pixels.

If, as the image signal, an image A (hereinafter called image 1080p) is input which is made up of 1920×1080 pixels, the image is displayed using almost the whole surface of the display area 5a of the liquid crystal panel 5. This image 1080p is scaled up by the projection lens 11 and displayed on almost the whole surface of the screen 10. Here, if, for example, a perpendicular (vertical direction in the figure) length of the display area 5a and that of the screen 10 are supposed to be Ld and Ls respectively, the resultant projection scaling factor is Ls/Ld, which is written as Lp.

If, an image B (hereinafter called image 720p) is input which is made up of 1280×720 pixels, on the other hand, the image is displayed using the 1280×720 pixels of the display area 5a of the liquid crystal panel 5. The microcomputer 2 controls the signal processing circuit 3 so that the center of the image 720p may be aligned with that of the liquid crystal panel 5. Further, the microcomputer 2 determines the number of pixels and the aspect ratio of the image 720p and compares the determined values to the number of pixels and the aspect ratio of the liquid crystal panel 5 to thereby control the magnification of the projection lens 11, thus displaying the image 720p as scaled up by a factor of 1.5×Lp on the screen 10. As a result, the image 720p is also displayed using almost the whole surface of the screen 10.

Figure 3:
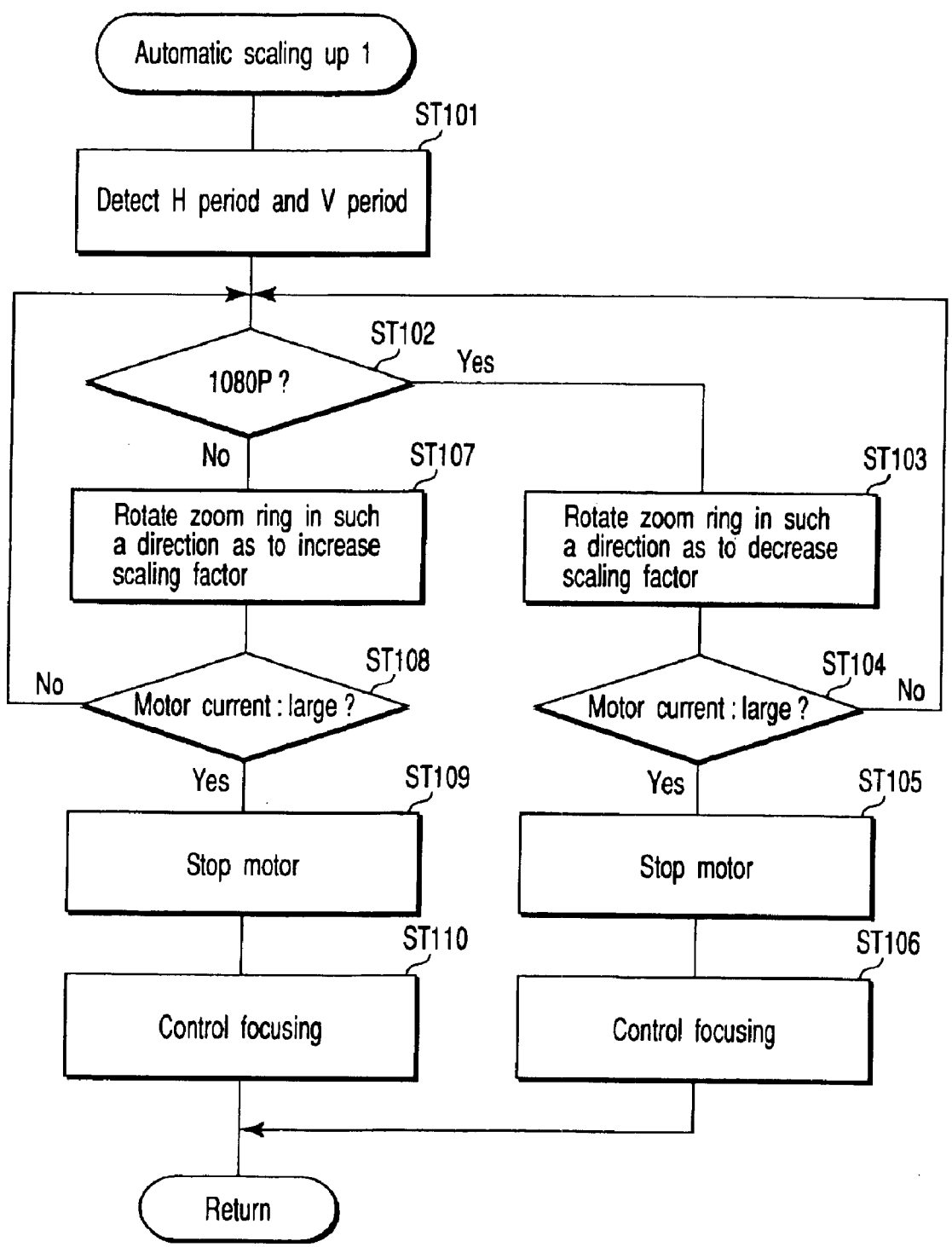
FIG. 3 is a flowchart of operations of the first embodiment of the invention.

FIG. 3 is a flowchart (in an automatic scaling up mode 1) of the operations of the embodiment of FIG. 1. In this mode, the image 1080p or 720p is supplied to the input terminal 1, so that the microcomputer 2 detects an H (horizontal) period and a V (vertical) period of the input image (ST101) and, based thereon, decides whether the image is the 1080p or not (ST102).

If the input image is 1080p, the microcomputer 2 sends a command to the motor 12a so that the zoom ring 14a may be turned in such a direction as to decrease the scaling factor (ST103). When the zoom ring 14a is turned to some extent, it cannot be turned any more, so that the motor 12a starts rotating idle. In this idling condition, a current flowing through the motor 12a increases rapidly, so that immediately after having detected this increase in current, the microcomputer 2 stops the motor 12a in rotation (ST104, ST105). As a result, the image displayed on the liquid crystal panel 5 is scaled up by a factor of Lp and displayed on the screen 10.

The zoom ring 14a has a reference position at which it has the scaling factor of Lp, so that at the projection step of ST103, the zoom ring 14a is turned to the reference position in the scaling down direction. When the projection lens 11 moves along the optical axis to the position of the scaling factor of Lp, the zoom ring 14a is stopped in rotation by a stopper (not shown). In this case, the motor 12a idles and the current increases up to a predetermined value or more, so that the microcomputer detects this increase in current and sends the rotation-stop command to the motor 12a to stop the rotation. It is to be noted that such control for stopping may be conducted by a position sensor (not shown). In this case, the microcomputer stops the motor 12a in accordance with an output of the detection by the position sensor.

Thereafter, the microcomputer 2 similarly operates the focus ring 12b in synchronization with the rotation of the zoom ring 14a, to control focusing of the image displayed on the screen 10 (ST106).

If the image is not 108° p. (in the case of NO at step ST102), on the other hand, the microcomputer 2 decides that the image 720p, which is different from the image 1080p, has been input and sends the command to the motor 12a to turn the zoom ring 14a in such a direction as to increase the scaling factor (ST107). When the projection lens 11 moves along the optical axis to the position of the scaling factor of Lp×1.5, the room ring 14a is similarly stopped in rotation by the stopper (not shown). In this case, the motor 12a idles and so the current increases up to the predetermined value or more, so that immediately after having detected this increase in current, the microcomputer 2 sends the command to the motor 12a to stop it (ST109) and then controls the focusing similarly (ST110).

In such a manner, the microcomputer 2 sets a smaller scaling up factor for the image 1080p having the larger number of pixels to thereby adapt a picture profile of the image 1080p to a profile of the screen 10. For the image 720p having the smaller number of pixels, on the other hand, the microcomputer 2 sets a larger scaling up factor to thereby provide scaled-up display of only a portion of the image that is displayed on the liquid crystal panel 5 as adapted to the profile of the screen 10.

Figure 4:
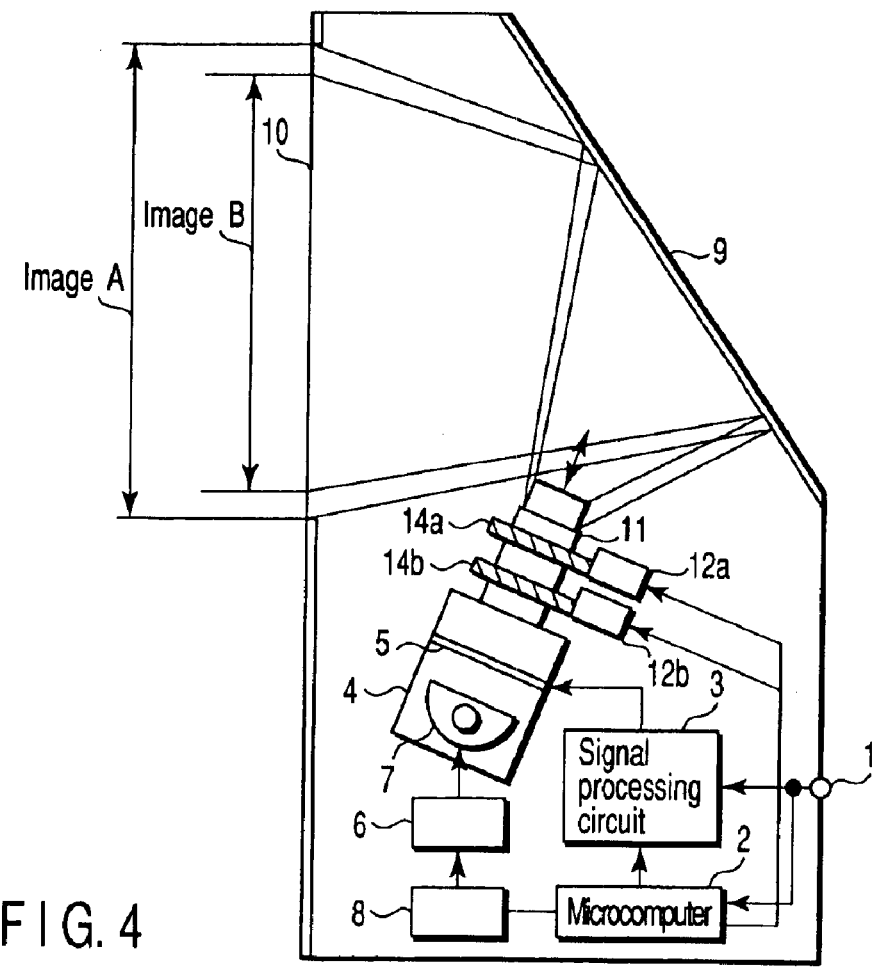
FIG. 4 is a block diagram of a configuration of a rear projector according to a second embodiment.

FIG. 4 is a block diagram which shows a rear projection system according to a second embodiment of the invention. A voltage switching circuit 8 switches a voltage to be applied on a light source 7, in accordance with a scaling factor of an image, so that a quantity of a light from the light source 7 can be switched by operating this voltage switching circuit 8 under the control of a microcomputer 2.

Figure 5:
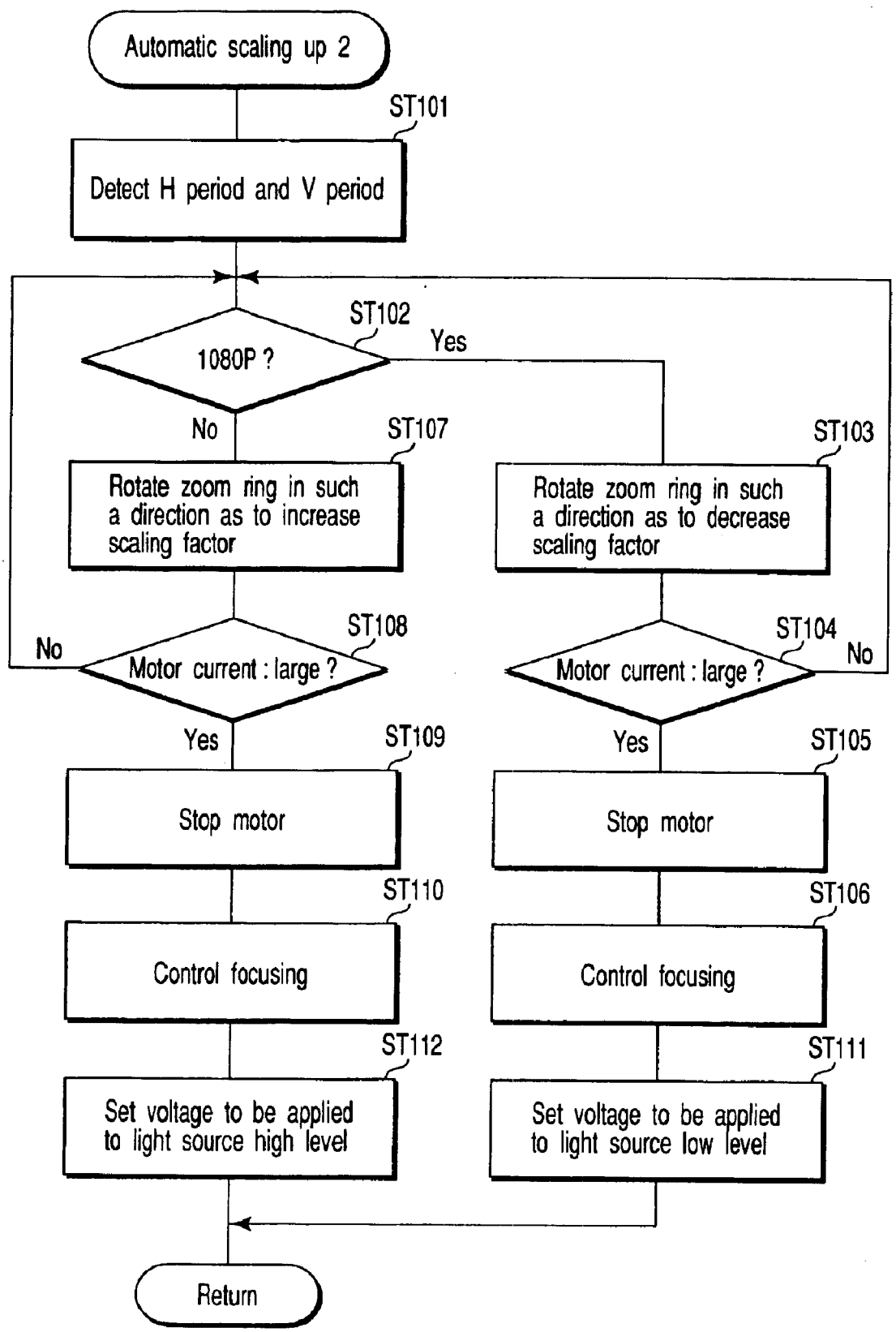
FIG. 5 is a flowchart of operations of the second embodiment.

FIG. 5 is a flowchart (automatic scaling up mode 2) of the operations of the embodiment of FIG. 4. This flowchart has the same steps as those of FIG. 3 except for an addition of steps ST111 and ST112.

The brightness of a viewing surface displayed on a screen 10 decreases as a scaling up factor of the image increases, and the brightness increases as the scaling up factor decreases, in a condition where a quantity of light emitted from the light source 7 is constant. In the embodiment of FIG. 4, the light emission quantity of the light source 7 is controlled so that the brightness of the viewing surface displayed on the screen 10 may not vary even if the scaling up factor varies.

The microcomputer 2 sends a command to the voltage switching circuit 8 so that the light emission quantity of the light source 7 may vary in accordance with an incoming image signal. That is, in the case of an image 1080p having a larger number of pixels, the microcomputer 2 sets a lower voltage to be applied on the light source 7 (ST111) and, in the case of an image 720p having a smaller number of pixels, sets a higher voltage to be applied (ST112). In such a manner, the brightness of the viewing surface which is displayed on the screen 10 is kept constant even if the scaling up factor has been changed.

Figure 6:
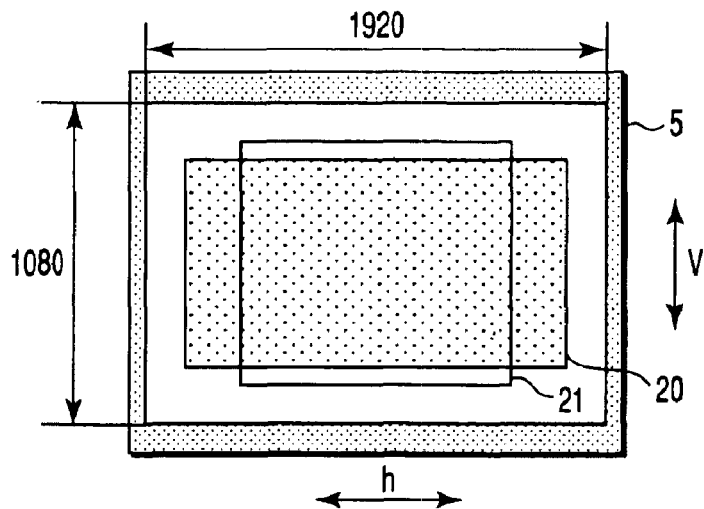
FIG. 6 shows an image viewing surface which has various display sizes and aspect ratios on a liquid crystal panel.

FIG. 6 shows an image viewing surface which has various display sizes and aspect ratios on a liquid crystal panel 5 according to a third embodiment of the invention. The present embodiment gives an example where when image signals containing various sizes and aspect ratios, such as those of image viewing surfaces 20 and 21, are input to the input terminal 1, relevant images are scaled up by an optimal scaling factor and displayed on the screen 10.

Figure 7:
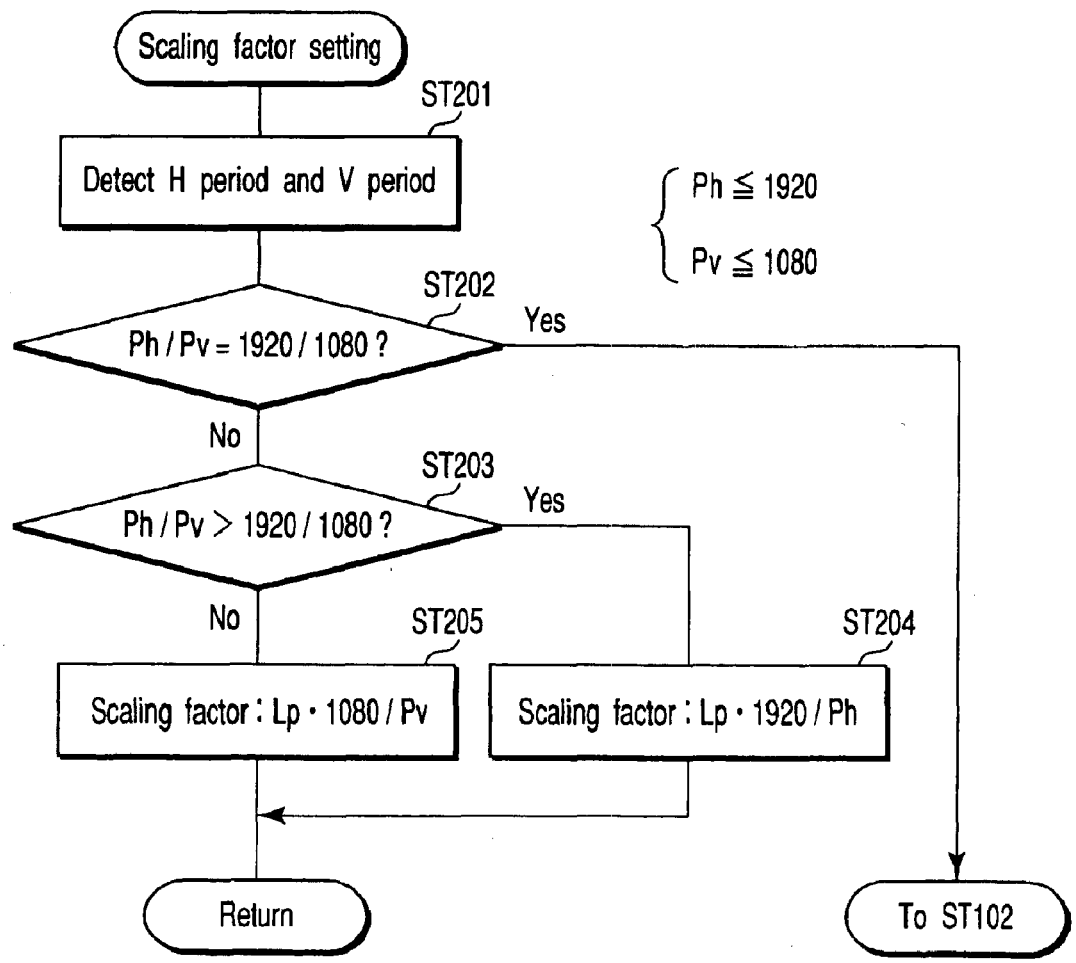
FIG. 7 is a flowchart of operations of a third embodiment.

FIG. 7 is a flowchart (scaling factor setting mode) which shows operations of the embodiment of FIG. 6. In the following discussion, it is assumed that the liquid crystal panel 5 is provided with 1920×1080 display pixels. Further, the incoming image is described with reference to an example where the number Ph of horizontal (h) pixels is 1920 or less and the number Pv of vertical (v) pixels is 1080 or less. It is to be noted that the respective numbers of pixels of the incoming image are not limited to those and the invention is applicable also to a case where these numbers of pixels exceed the number of display pixels of the liquid crystal panel 5.

The microcomputer 2 detects an H period and a V period of the input image (ST201) and decides whether a ratio Ph/Pv between the number Ph of horizontal pixels and the number Pv of vertical pixels of the image agrees with a ratio 1920/1080 between the numbers of pixels of the liquid crystal panel 5 (ST202). If they agree, the flow moves to step ST102 of FIG. 3 or 5, where the zoom ring 14a is rotated to thereby scale up and display the image on the liquid crystal panel 5 so that its picture profile may be adapted to a profile of the screen 10.

Further, if the ratio Ph/Pv between the numbers of pixels of the image is larger than the ratio 1920/1080 between the numbers of pixels of the liquid crystal panel 5 (in the case of YES at step ST203), the microcomputer 2 sends a command to a motor 12a to rotate the zoom ring 14a so that the scaling factor may become (1920/Ph)×Lp (ST204). As described above, the scaling factor Lp refers to the one when an image 1080p is scaled up and displayed so that its picture profile may be adapted to the profile of the screen 10. As a result, a horizontally long image such as the image viewing surface 20 of FIG. 6 is scaled up and displayed so that right and left edges of its picture profile may be aligned with those of the profile of the screen 10 respectively.

It is to be noted that in this case the zoom ring can be controlled in rotation angle by a position sensor provided in the periphery of the zoom ring as described above. Further, this rotation angle can be controlled also by controlling the number of pulses to be supplied to the motor 12a if it is a stepping motor. Furthermore, this rotation angle can be controlled by both the position sensor and the stepping motor.

If the ratio Ph/Pv between the numbers of pixels of the image is smaller than the ratio 1920/1080 between the numbers of pixels of the liquid crystal panel 5 (in the case of NO at step ST203), on the other hand, the microcomputer 2 sends the command to the motor 12a to rotate the zoom ring 14a so that the scaling factor may become (1080/Pv)×Lp (ST205). As a result, an image viewing surface having a relatively small horizontal width such as the image viewing surface 21 of FIG. 6 is scaled up and displayed so that only the top and the bottom of its picture profile may be aligned with those of the profile of the screen 10 respectively.

A fourth embodiment gives an example where an arbitrary region on a liquid crystal panel 5 is zoomed in accordance with an instruction from a user and scaled up through a projection lens 11 and displayed on a whole surface of a screen 10.

Figure 8A:
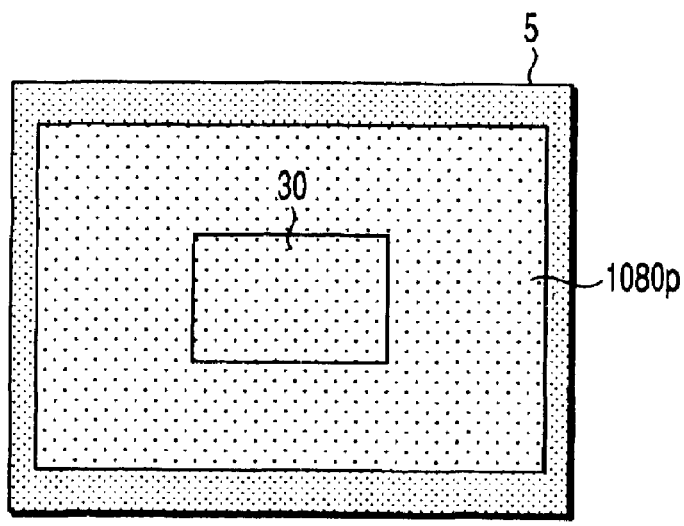
FIGS. 8A to 8C show regions which are displayed on the liquid crystal panel by scaling processing and shift processing.

FIG. 8A shows a region 30 (central region) on the liquid crystal panel 5 which is displayed on the screen 10 when an image 1080p is displayed on the liquid crystal panel 5 and scaled up by a scaling up factor larger than the scaling factor Lp and displayed on the screen 10.

Figure 8B:
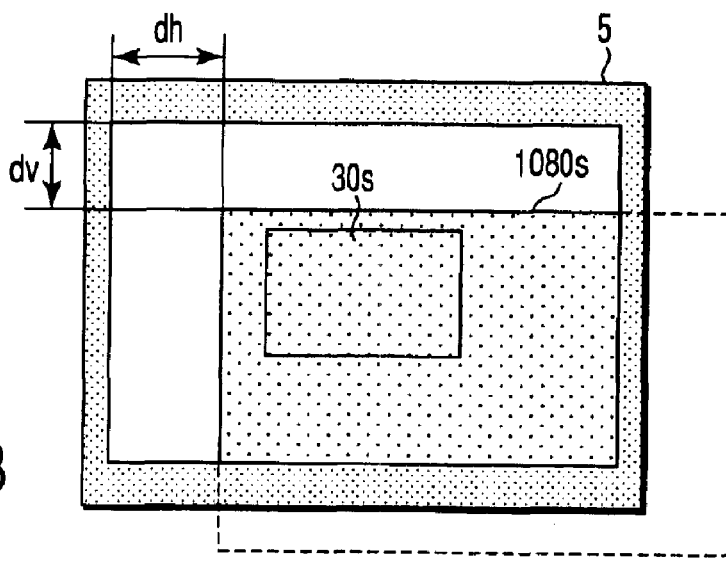

FIG. 8B shows an example where when the image 1080p is to be displayed on the liquid crystal panel 5, an image (1080s) as shifted horizontally by dh and vertically by dv is displayed and a central region 30s (which corresponds to a left top region of the input image) displayed on the liquid crystal panel 5 is scaled up by a zoom function of the projection lens 11 and displayed on the screen 10.

Figure 8C:
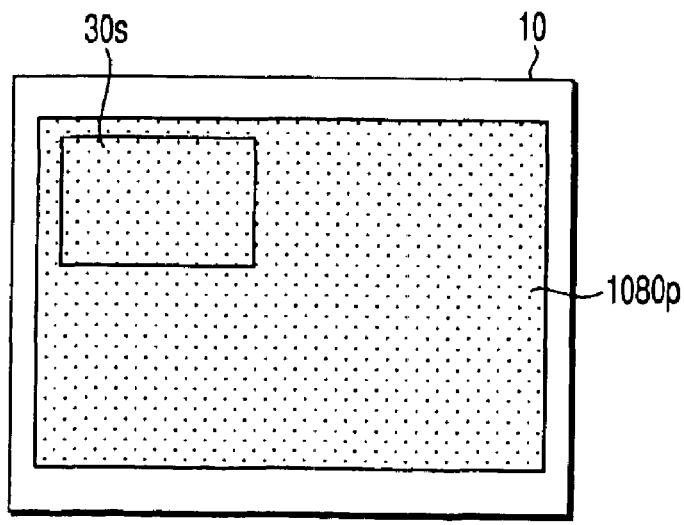

It is thus possible to scale up and display the arbitrary region 30s in the image displayed on the screen 10 as shown in FIG. 8C, in accordance with the user's instructions for scaling up and shifting.

Figure 9:
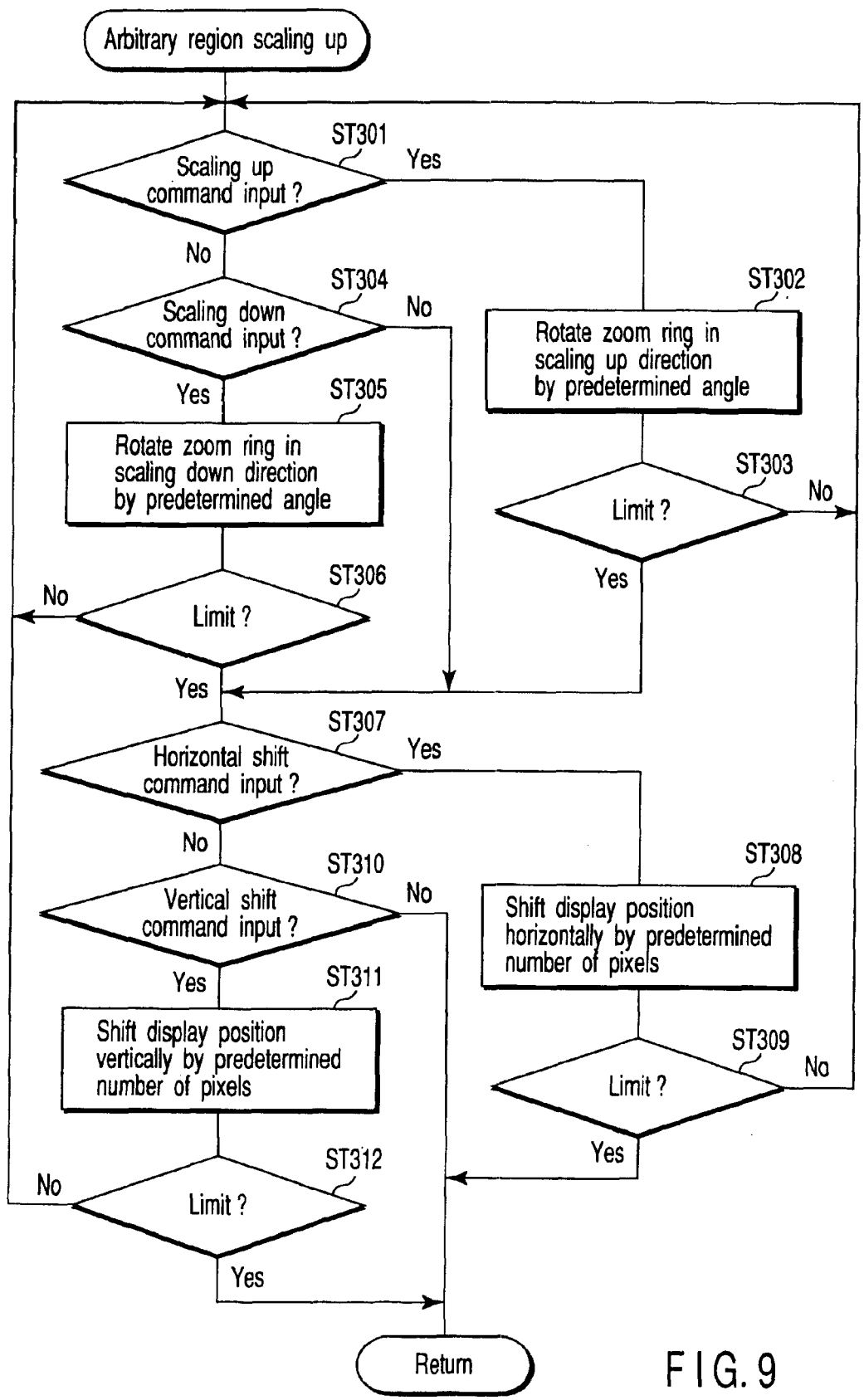
FIG. 9 is a flowchart of operations of a fourth embodiment.

FIG. 9 is a flowchart which shows operations of the fourth embodiment. To simplify explanation, description about control of focusing is omitted.

When a scaling up command is input through a user interface (not shown), such as an operation panel or a remote control, (in the case of YES at step ST301), the microcomputer 2 sends a command to the motor 12a to rotate the zoom ring 14a in a scaling up direction by as much as a predetermined angle (ST302). Each time the scaling up command is input, the microcomputer 2 repeats the rotation of the zoom ring by as much as the predetermined angle in the scaling up direction. When the rotation angle of the zoom ring reaches a limit (in the case of YES at step ST303), the flow moves to step ST307.

When a scaling down command is input through the user interface (in the case of YES at step ST304), the microcomputer 2 sends a command to the motor 12a to rotate the zoom ring 14a in a scaling down direction by as much as a predetermined angle (ST305). Each time the scaling down command is input, the microcomputer 2 repeats the rotation of the zoom ring by as much as the predetermined angle in the scaling down direction. When the rotation angle of the zoom ring reaches a limit (in the case of YES at step ST306), the flow moves to ST307.

When a horizontal shift command is input through the user interface (in the case of YES at step ST307), the microcomputer 2 sends the command to the signal processing circuit 3 to horizontally shift a display position of the image displayed on the liquid crystal panel 5 by as much as a predetermined number of pixels (ST308). Each time the horizontal shift command is input, the microcomputer 2 repeats the horizontal shifting of the image displayed on the liquid crystal panel by as much as the predetermined number of pixels, unless the shift amount reaches a limit (ST309).

When a vertical shift command is input through the user interface (in the case of YES at step ST310), the microcomputer 2 sends the command to the signal processing circuit 3 to vertically shift the display position of the image displayed on the liquid crystal panel 5 by as much as a predetermined number of pixels (ST311). Each time the vertical shift command is input, the microcomputer 2 repeats the vertical shifting of the image displayed on the liquid crystal panel by as much as the predetermined number of pixels, unless the shift amount reaches a limit (ST312).

Such shift processing requires for its performing only that an offset be given to the display position of the image contained in an image signal and so is much simpler than image processing such as scaling and can be realized easily.

Using a rear projector according to the present embodiment, the user who is viewing an image content can pause the image at a selected moment and further scale up a spotlight region to display it on the screen 10.

Although the present embodiment has been described in the case where the arbitrary region of the image 1080*p* is scaled up and displayed, it is apparent that the present embodiment is applicable also to the images that have any other aspect ratio and any number of pixels.

Additional advantages and modifications will readily occur to those skilled in the art. Therefore, the invention in its broader aspects is not limited to the specific details and representative embodiments shown and described herein. Accordingly, various modifications may be made without departing from the scope of the general invention concept as the appended claims and their equivalents.

What is claimed is:

1. A projection type display apparatus which drives a display device by an input image signal to project an image displayed on the display device onto a screen and to thereby display the image thereon, comprising:

the display device having a predetermined number of display pixels;

a light source which serves to make light incident upon the display device;

a projection lens which serves to project the image light emitted from the display device onto the screen and which has a zoom function to scale up the projected image by an arbitrary scaling factor;

a projection lens drive section which operates the projection lens to alter the projection scaling factor; and a control section which sets the scaling factor in accordance with a type of input image signal to control the projection lens drive section in accordance with the scaling factor thus set, the control section sets the scaling factor so that a size of a viewing surface displayed on the screen may be essentially the same in a case where the image displayed in a first region of the display device is projected onto the screen and in a case where the image displayed in a second region which is smaller than the first region is projected onto the screen, wherein if Ph/Pv>Ph0/PV0 in which Ph0 and Pv0 are the number of horizontal pixels and the number of vertical pixels of the display device, respectively, and Ph and Pv are the number of horizontal pixels and the number of vertical pixels of the input image signal, respectively, the control section determines the scaling factor in accordance with a ratio between the number of the horizontal pixels of the display device and the number of the horizontal pixels of the input image signal and, if Ph/Pv<Ph0/Pv0, the control section determines the sealing factor in accordance with a ratio between the number of the vertical pixels of the display device and the number of the vertical pixels of the input image signal.

2. A projection type display apparatus according to claim 1, wherein the control section comprises an alteration section which alters the scaling factor in accordance with a scaling factor alteration instructing request and a shift section which shifts a display position of the image displayed on the display device in accordance with a display position shifting request.

3. A projection type display apparatus according to claim 1, further comprising:

a brightness adjustment section which adjusts brightness of the light source in accordance with the set scaling factor, the control section setting the scaling factor so that a size of a viewing surface displayed on the screen may be essentially the same in a case where the image displayed in a first region of the display device is projected onto the screen and in a case where the image displayed in a second region which is smaller than the first region is projected onto the screen, and the brightness adjustment section increasing the brightness of the light source as the scaling factor increases.

4. A rear projection type display apparatus which drives a display device by an input image signal to thereby project an image displayed on the display device onto a screen for display, comprising:

the display device having a predetermined number of display pixels;

a light source which serves to make light incident upon the display device;

a projection lens which serves to project the image light emitted from the display device onto the screen and also has a zoom function to scale up the projected image by an arbitrary scaling factor;

a mirror which reflects the projected image from the projection lens at least once to thereby guide the projected image to a rear of the screen;

a projection lens drive section which operates the projection lens to thereby alter a projection scaling factor; and a control section which sets the scaling factor in accordance with a type of the input image signal and, in accordance with the thus set scaling factor, controls the projection lens drive section, the control section sets the scaling factor so that a size of a viewing surface displayed on the screen may be essentially the same in a case where the image displayed in a first region of the display device is projected onto the screen and in a case where the image displayed in a second region which is smaller than the first region is projected onto the screen, wherein if Ph/Pv>Ph0/PV0 in which Ph0 and Pv0 are the number of horizontal pixels and the number of vertical pixels of the display device, respectively, and Ph and Pv are the number of horizontal pixels and the number of vertical pixels of the input image signal, respectively the control section determines the scaling factor in accordance with a ratio between the number of the horizontal pixels of the display device and the number of the horizontal pixels of the input image signal and, if Ph/Pv<Ph0/Pv0, the control section determines the scaling factor in accordance with a ratio between the number of the vertical pixels of the display device and the number of the vertical pixels of the input image signal.

5. A rear projection type display apparatus according to claim 4, further comprising a brightness adjustment section which adjusts brightness of the light source, the brightness adjustment section increasing the brightness of the light source as the scaling factor increases.

* * * * *